United States Patent
Foster

(10) Patent No.: US 11,029,181 B2
(45) Date of Patent: Jun. 8, 2021

(54) VORTEX FLOWMETER WITH FLOW INSTABILITY DETECTION

(71) Applicant: Micro Motion, Inc., Boulder, CO (US)

(72) Inventor: Jeffry Duane Foster, Saint Louis Park, MN (US)

(73) Assignee: MICRO MOTION, INC., Boulder, CO (US)

( * ) Notice: Subject to any disclaimer, the term of this patent is extended or adjusted under 35 U.S.C. 154(b) by 336 days.

(21) Appl. No.: 16/016,163

(22) Filed: Jun. 22, 2018

(65) Prior Publication Data

US 2019/0390986 A1    Dec. 26, 2019

(51) Int. Cl.
*G01F 1/32* (2006.01)

(52) U.S. Cl.
CPC .................................. *G01F 1/329* (2013.01)

(58) Field of Classification Search
CPC ....... G01F 1/329; G01F 1/3209; G06Q 50/06; H02N 3/00
USPC ........... 702/45, 98, 100, 106, 179, 182, 183; 73/197, 861.22, 861.24, 861.26
See application file for complete search history.

(56) References Cited

U.S. PATENT DOCUMENTS

| | | | |
|---|---|---|---|
| 3,616,693 A | 11/1971 | Burgess | |
| 3,719,080 A | 3/1973 | Burgess | |
| 5,942,696 A | 8/1999 | Kleven | |
| 6,220,103 B1 * | 4/2001 | Miller | G01F 1/3263 73/861.22 |
| 6,484,590 B1 | 11/2002 | Kleven et al. | |
| 6,531,884 B1 | 3/2003 | Kleven | |
| 2002/0129661 A1 * | 9/2002 | Clarke | G01F 1/329 73/861.22 |
| 2004/0024568 A1 | 2/2004 | Eryurek et al. | |
| 2019/0348929 A1 * | 11/2019 | Paschke | G06Q 50/06 |

FOREIGN PATENT DOCUMENTS

| | | |
|---|---|---|
| CN | 201622083 | 11/2010 |
| CN | 209485440 | 10/2019 |
| DE | 10 2012 112 800 | 6/2014 |
| JP | 2011-232201 | 11/2011 |

OTHER PUBLICATIONS

"Measurement, Instrumentation, and Sensors Handbook Electromagnetic, Optical, Radiation, Chemical, and Biomedical Measurement", edited by J. Wester et al., 2014, 3 pgs.

(Continued)

*Primary Examiner* — John H Le
(74) *Attorney, Agent, or Firm* — Westman, Champlin & Koehler, PA

(57) ABSTRACT

A vortex flowmeter for measuring a flow rate of a process fluid, including a vortex generator arranged to generate vortices in a flow of the process fluid, a vortex sensor arranged to sense the vortices in the flow of the process fluid and responsively provide a sensor output related to the flow rate of the process fluid, measurement circuitry configured to receive the sensor output and provide a digital output, a memory configured to store measurements based upon the digital output; and diagnostic circuitry coupled to the memory arranged to detect instability in the flow of the process fluid based upon the measurements stored in the memory.

20 Claims, 6 Drawing Sheets

(56) References Cited

OTHER PUBLICATIONS

Notification of Transmittal of the International Search Report and the Written Opinion of the International Searching Authority, from International Application No. PCT/US2019/028256, dated Jul. 19, 2019.
Office Action from Chinese Patent Application No. 201811292013.52, dated Jul. 3, 2020.
Office Action from Chinese Patent Application No. 201811292013.5, dated Dec. 11, 2020.
Communication Pursuant to Rules 161(1) and 162 EPC from European Patent Application No. 19722399.3, dated Dec. 3, 2020.

* cited by examiner

US 11,029,181 B2

VORTEX FLOWMETER WITH FLOW INSTABILITY DETECTION

BACKGROUND

The present invention relates to flowmeters such as vortex shedding meters or swirlmeters which are responsive to a fluid flow. More specifically, the present invention relates to detection of flow instability by such flowmeters.

Flowmeters sense the flow of liquids or gasses in conduits and produce a signal indicative of the flow. The presence of an obstacle known alternatively as a shedding bar, bluff body, or vortex generator, in a flow conduit causes periodic vortices in the flow. The frequency of these vortices is directly proportional to the flow velocity in the flowmeter. The shedding vortices produce an alternating differential pressure across the bluff body. This differential pressure is converted to an electrical signal by piezoelectric crystals or other differential pressure devices. The magnitude of the differential pressure or electric signal is proportional to $\rho V^2$, where p is the fluid density and V is the fluid velocity. The vortex flowmeter produces pulses having a frequency proportional to the flow rate.

The vortex flowmeter is a measurement transmitter that is typically mounted in the field of a process control industry installation where power consumption is a concern. The vortex flowmeter can provide a current output representative of the flow rate, where the magnitude of current varies between 4-20 mA on a current loop. It is also desirable for the vortex flowmeter to be powered completely from the current loop so that additional power sources need not be used.

It is known to incorporate a microprocessor into a vortex flowmeter. The microprocessor receives digital representations of the output signal from the vortex sensor and computes desired output quantities based on parameters of the digital representation.

Certain conditions in the flow of the process fluid through the flowmeter can cause errors in flow rate measurements by the flowmeter. It would be desirable to detect such conditions and/or correct for errors caused by such conditions.

SUMMARY

A vortex flowmeter for measuring a flow rate of a process fluid includes a vortex generator arranged to generate vortices in a flow of the process fluid. A vortex sensor is arranged to sense the vortices in the flow of the process fluid and responsively provide a sensor output related to the flow rate of the process fluid. Measurement circuitry to receive the sensor output and provides a digital output. A memory is configured to store measurements based upon the digital output. Diagnostic circuitry coupled to the memory detects instability in the flow of the process fluid based upon the measurements stored in the memory.

DETAILED DESCRIPTION OF ILLUSTRATIVE EMBODIMENTS

This invention relates to a vortex meter diagnostic that detects a flow of process fluid that is unstable. In particular, flows that are sufficiently unstable result in an erroneous measurement that can be detected. Most flow technologies require stable or slowly varying flowrates. By determining the variation in period for each shedding cycle, the device can alert an operator when the flow rate periodically varies too quickly to obtain an accurate flow measurement.

Figure 1:
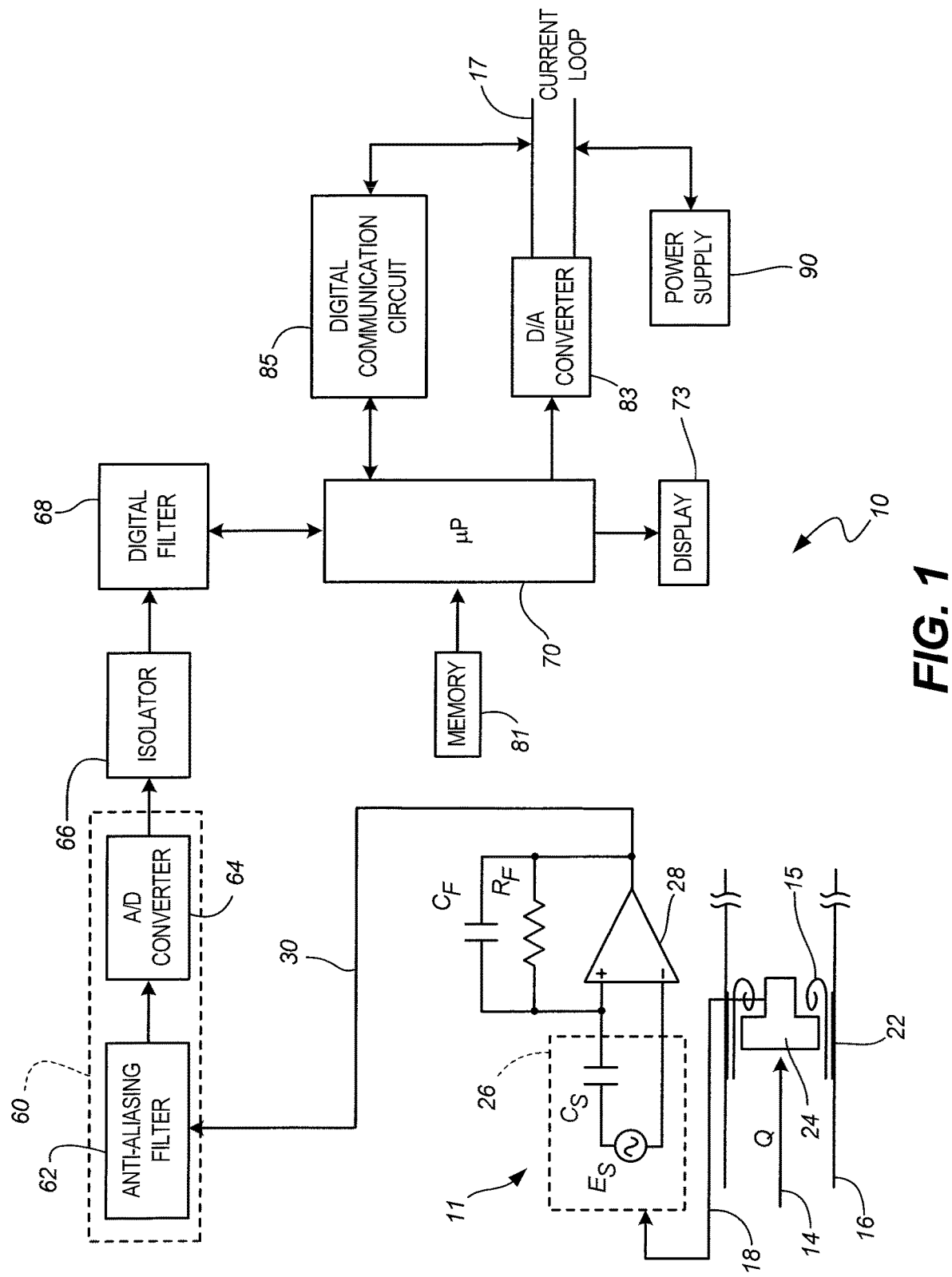
FIG. 1 is a block diagram of a vortex flowmeter in accordance with one configuration of the present invention.

FIG. 1 illustrates an embodiment of a vortex flowmeter 10 of the present invention. Generally, the vortex flowmeter 10 includes a vortex sensor 11 that senses vortices 15 in a fluid 14 that flows through a conduit 16. The vortex sensor 11 is operably coupled to an electronic circuit that produces a 4-20 mA current on a current loop 17 indicative of flow as well as an optional square wave output $F_{out}$ (not shown) having a frequency proportional to fluid flow.

The vortex flowmeter 10 includes a vortex meter housing 22 having a bluff body 24 located therein. When the fluid 14 flows past the bluff body 24, shedding vortices 15 having a frequency indicative of the flow rate are produced. A vortex sensor 26 preferably located at the bluff body 24, senses a pressure difference associated with the shedding vortices 15. The vortex sensor 26 can include, for example, a piezoelectric sensor. The sensor 26 has characteristics approximated by a potential source $E_s$ and a series capacitor $C_s$. The magnitude of the output signal from the piezoelectric sensor 26 is proportional to the differential pressure, which is proportional to the $\rho V^2$, where $\rho$ is the fluid density and V is the velocity of the fluid 14, and also proportional to $\rho D^2 F^2$, where D is the inside diameter of the meter housing 22 and F is the shedding frequency of the vortices 15.

The output of the piezoelectric sensor 26 is coupled to an amplifier 28 which includes capacitor CF and a resistor $R_F$. The amplifier 28 provides an analog output signal on line 30. The signal on line 30 is provided to input circuitry 60 including an anti-aliasing filter 62 and an analog-digital (sigma-delta) converter indicated at 64. The anti-aliasing filter 62 filters the signal from line 30 to remove unwanted high-frequency noise and performs anti-aliasing filtering.

The analog-digital converter 64 samples the signal from filter 62 and outputs a single bit datastream which is indicative of the amplitude and frequency of the vortices 15. The relative number of ones and zeros, sometimes called the bit density, is representative of the amplitude of the vortices 15. The digital datastream is transmitted across an electrical isolation barrier 66 required for sensors which are grounded or have leakage current to ground.

Digital filter 68 is an optional component and can be used for digitally preprocessing the digital data stream from the analog to digital converter 64. A microprocessor 70 can be used to calculate an output signal related to fluid flow using the equations discussed in the Background section. Microprocessor 70 operates in accordance with instructions stored in memory 81. The microprocessor 70 provides a desired output value to a digital to analog converter 83 for converting the digital value into a 4-20 mA current representation of flow of the process fluid. This current level is applied to the two-wire process control loop 17. A digital communication circuit 85 can also be employed for sending information on the process control loop 17 related to flow using known formats. Communication circuitry 85 can be used for both sending and receiving data. A display 73 provides a user interface for the vortex flowmeter 10. Power supply 90 is connected to loop 17 and can be used for providing power to the flowmeter 10.

As discussed in the Background section, certain conditions and the flow of process fluid through the process piping 16 can cause errors in flow measurements. One such condition is instability in the process flow. For example, during the start up operations, some vortex flowmeters may produce erroneous readings due to unstable flow of the process fluid. This type of instability may be readily apparent when observing the output from the flowmeter. However, in certain situations, during steady state operation, the flowmeter may erroneously produce a stable output even though the flow itself is experiencing instability. For example, if during steady state operation the flow is widely varying, the flowmeter may not detect such instability if the flow variations are in a certain frequency range. For example, a 4 Hz instability may go undetected. Such an instability can cause the flowmeter to report a flow measurement which is significantly less than the actual flow rate. This type of error is introduced independent of the technology used to measure the vortex shedding such as a piezoelectric sensor, differential pressure sensor, optical or acoustic based sensor, etc.

Figure 2:
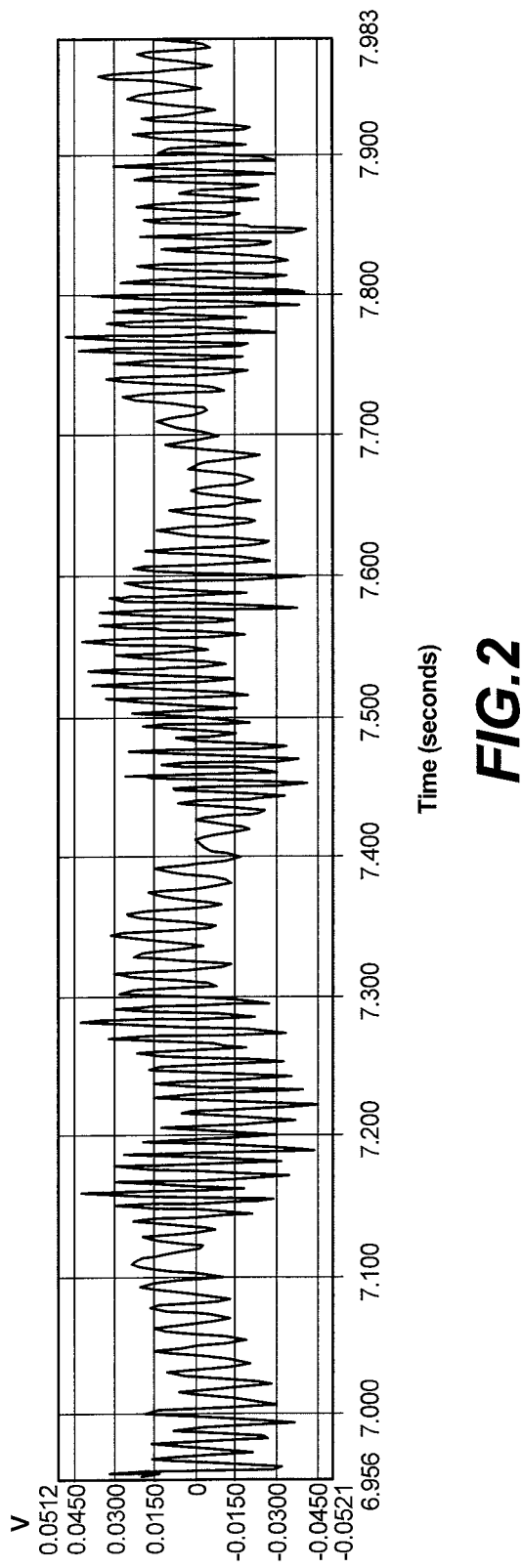
FIG. 2 is a graph of the output of a vortex sensor versus time.

FIG. 2 is a graph of the output of a vortex sensor and is a graph of signal amplitude versus time. FIG. 2 illustrates a significant frequency in amplitude modulation that occurs in a cyclic manner with a time period of about 0.3 seconds.

Figure 3:
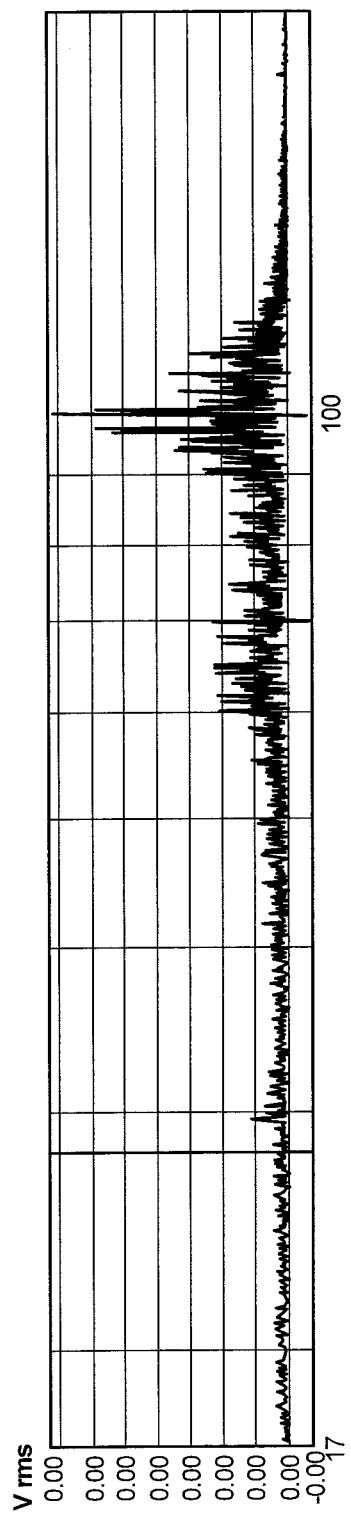
FIG. 3 is a graph of the frequency spectrum of the signal shown in FIG. 2.
Figure 5:
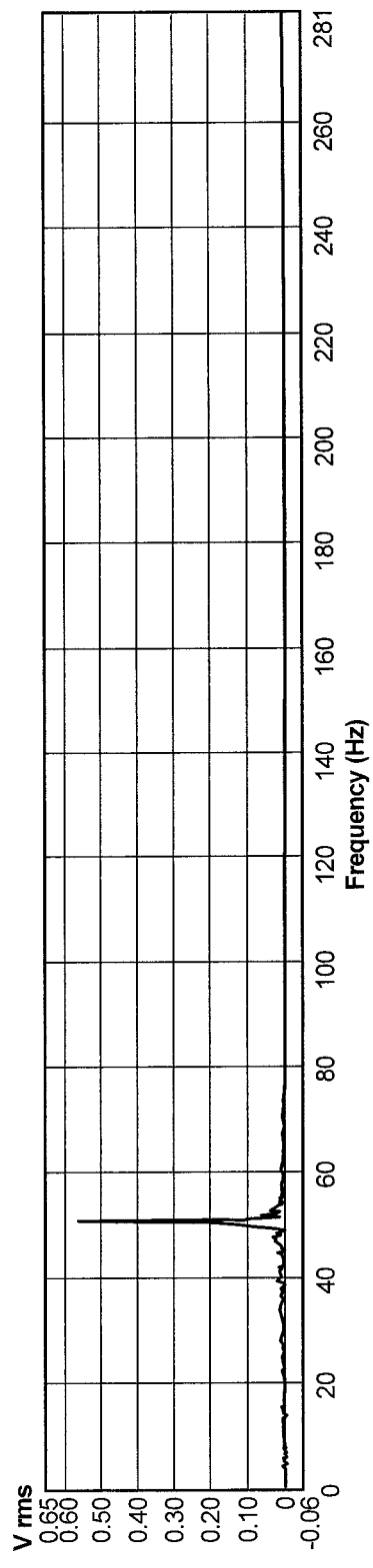
FIG. 5 is a graph of amplitude versus frequency for a steady state vortex flow signal as shown in FIG. 4.

FIG. 3 is an illustration of the signal of FIG. 2 converted into the time domain and is a graph of amplitude versus frequency and illustrates numerous peaks having roughly the same amplitude. Such a frequency domain signature in which numerous peaks are detected can be used by microprocessor 70 to provide an output indicating the occurrence of flow instability. (As illustrated in FIG. 5, the output signal in the frequency domain should have a single peak.).

Figure 4:
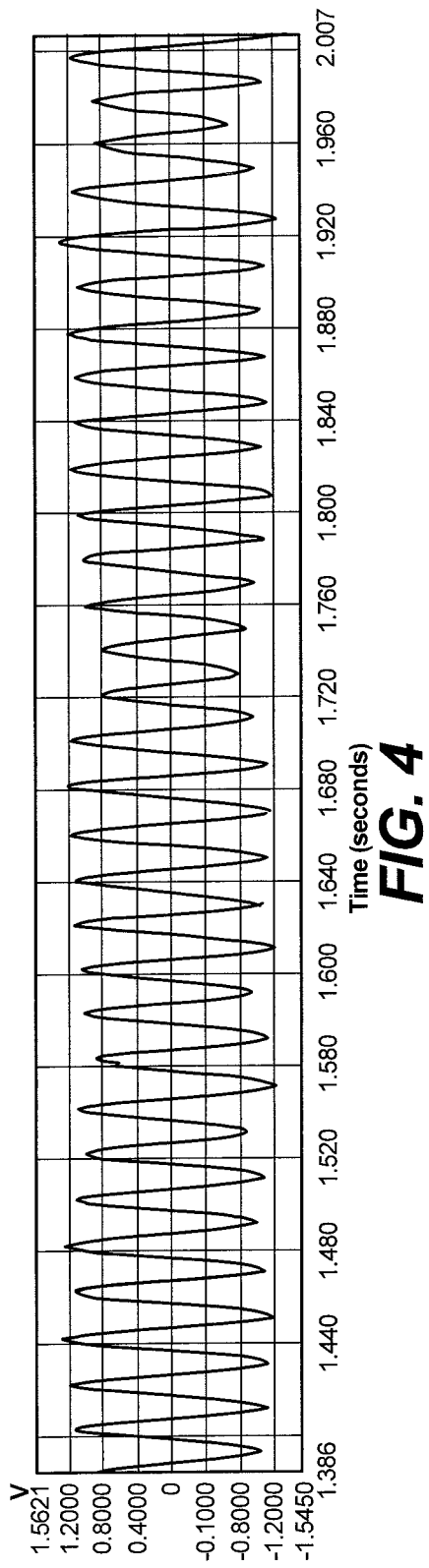
FIG. 4 is a graph of amplitude versus time for a vortex sensor.

In contrast to FIG. 2, FIG. 4 is a graph of amplitude versus time for a stable, steady state flow of process fluid as sensed by a vortex sensor. FIG. 5 shows the frequency spectrum of the signal from FIG. 4 and is a graph of amplitude versus frequency. As illustrated in FIG. 5, the flow signal is readily apparent at about 50 Hz.

Figure 6:
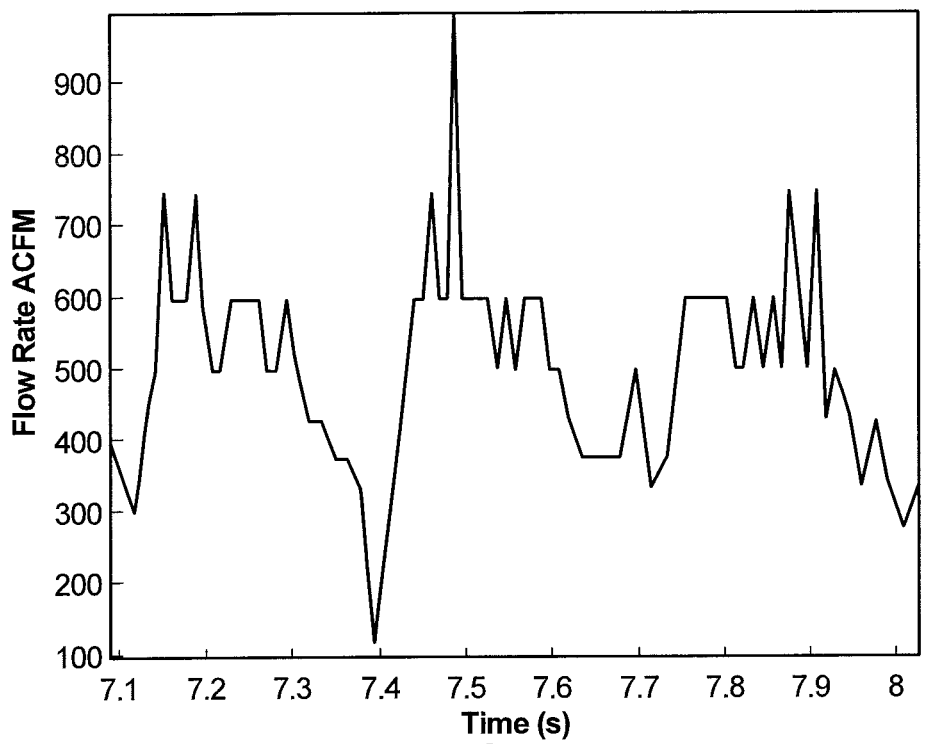
FIG. 6 is a graph of calculated flow rate versus time.
Figure 7:
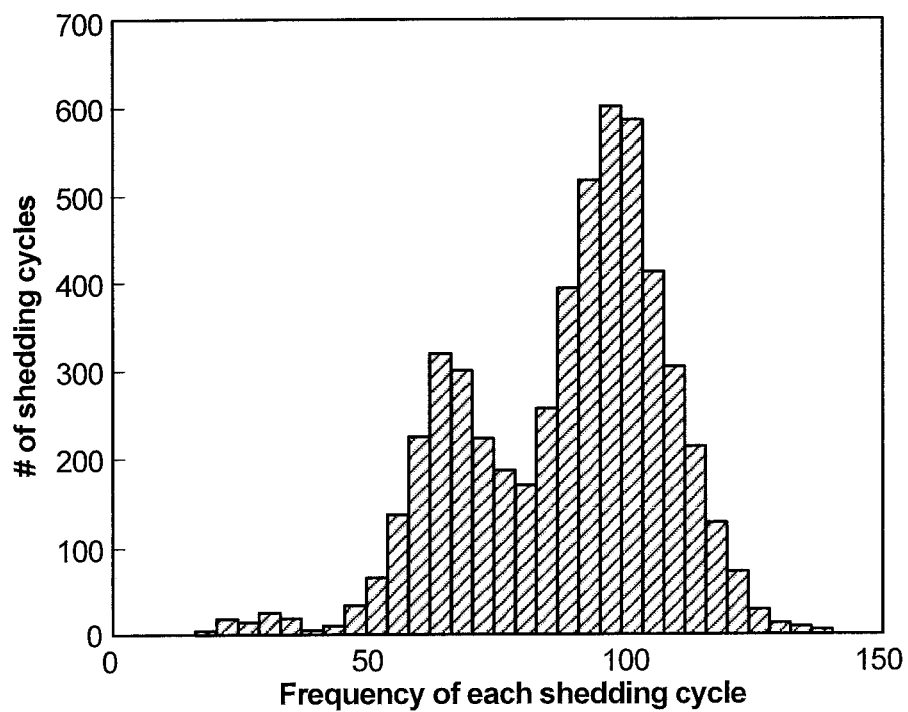
FIG. 7 is a histrograph showing the number of shedding cycles versus the frequency of each shedding cycle using the signal as illustrated in FIG. 2.

FIG. 6 shows flow rate calculated per pulse using the data sample illustrated in FIG. 2. As illustrated in FIG. 6, the calculated flow rate varies greatly between samples. Using this data, a histogram was created as illustrated in FIG. 7 of the shedding cycles collected over 30 seconds. FIG. 7 clearly illustrates a bi-modal distribution in the frequency of each shedding cycle. Thus, it is apparent that the flowrate 14 is constantly in a transient state. However, the output as determined by microprocessor 70 is stable because the average is roughly consistent over the 1 to 2 second measurement span. This introduces an error in the measured flow rate.

As such variations may introduce erroneous measurements, it is desirable to alert an operator that the vortex sensor may be providing such erroneous readings. In one configuration, in order to provide an alert regarding the periodic variations in flowrate, the shedding cycle period is measured and a number of such measurements are stored in memory 81, as shown in FIG. 1. These stored periods may then be examined using any number of statistical and/or signal processing techniques and a flag can be set to indicate flow instability. For example, if the threshold value is reached, the flowmeter 10 can use the digital communication circuitry 85 to provide an alert. Such alert may be provided over, for example, HART®, Fieldbus, Modbus, or other communication techniques. Similarly, in an SIF (Safety Instrumented Function) application, an alarm can be provided to indicate that the flowmeter 10 is operating outside of a safety accuracy range.

In one specific configuration, microprocessor 70 stores vortex shedding period information in memory 81. Using this stored information, the microprocessor 70 calculates a standard deviation of the period using the collective samples. During typical steady state operation, the standard deviation for a vortex shedding period should vary between about four and seven percent depending upon the particular meter body design and flow regime. The standard deviation in other flowmeter configurations may range between eight and ten percent.

The microprocessors 70 can compare the calculated standard deviation to an acceptable threshold. If the standard deviation exceeds such a threshold, a warning can be provided. In another example configuration, if the standard deviation of the samples is greater than a percentage of the mean of the samples, for example 12 percent, a diagnostic flag can be set indicating flow instability.

In another example configuration, the collected period data is tested to determine if it is unimodal. Various tests are known in the art for detecting if a dataset is unimodal and include the use of the histogram illustrated in FIG. 7. However, any appropriate test for unimodality may be employed. If unimodality is not detected through the test, a warning can be provided indicating that the process flow is in stable.

In another example configuration, the collected data is analyzed in the frequency domain, for example, using a fast Fourier transform performed by microprocessor 78. In such a configuration, digital samples from the vortex sensor are stored in the memory 81 and used to perform the fast Fourier transform. Using the frequency domain data, changes in the shedding frequency over time with respect to frequencies which exceed a threshold level may be observed. For example, a threshold of 25% of the highest peak may be employed within a measurable frequency range. This configuration eliminates structural resonances from causing a possible false alarm. Changes which are more rapid than a threshold value, for example, three times a standard deviation of the signal, can be used to trigger a flow instability diagnostic warning.

Figure 8:
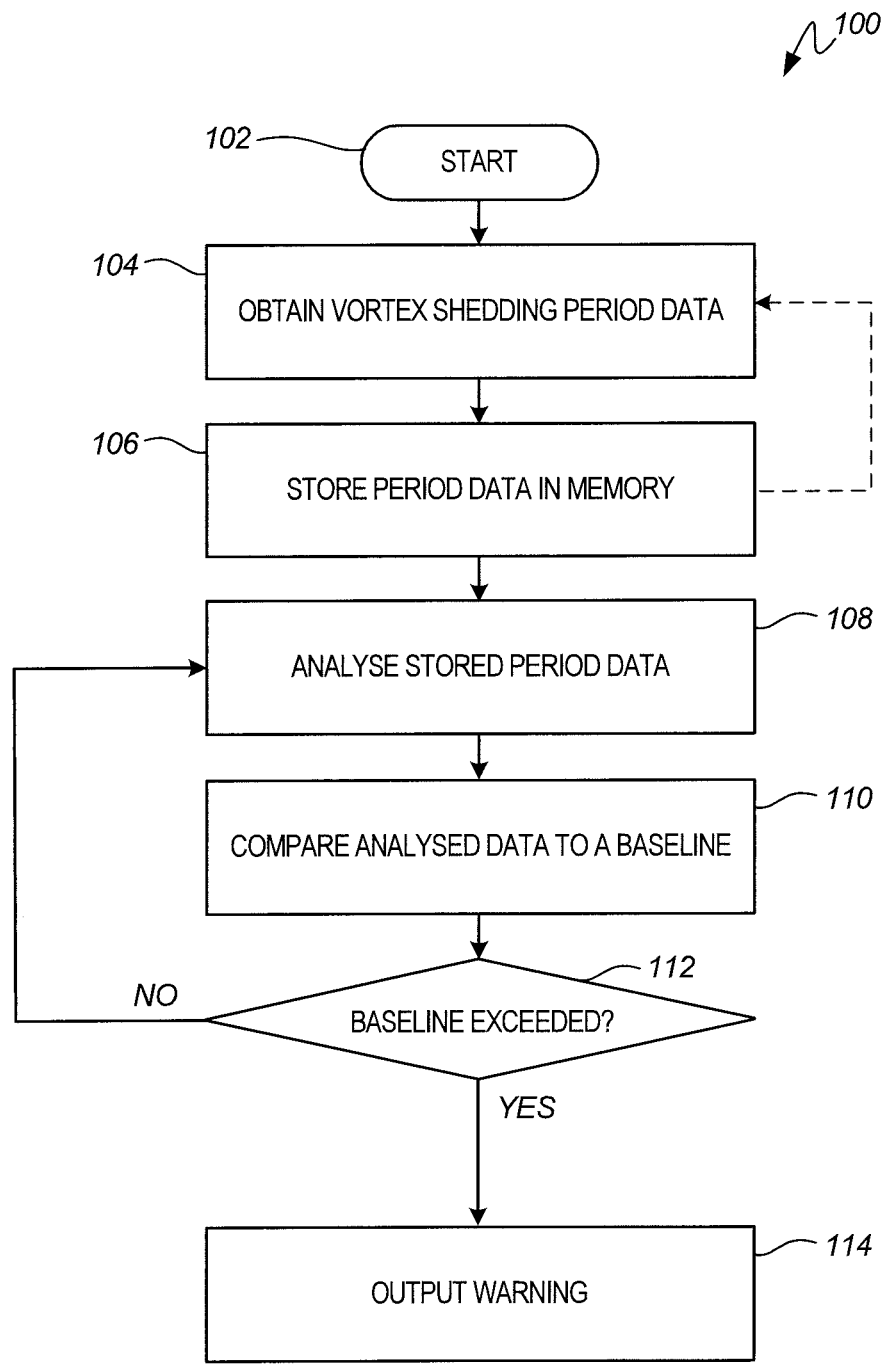
FIG. 8 shows a simplified block diagram showing steps with identifying flow instability in a vortex flowmeter.

FIG. 8 is a simplified block diagram 100 showing steps implemented by microprocessor 70 in accordance with instructions stored in, for example, memory 81 for detecting flow instability using the above mentioned techniques. The block diagrams 100 starts at block 102 and block 104 vortex shedding period data is obtained. At block 106, the obtained period data is stored in memory 81. Blocks 104-106 may independently operate as illustrated by the dashed arrow whereby period data is continuously collected. At block 108, the period data stored in memory 81 is analyzed using statistical or other analyzing techniques including both techniques implemented using time and/or frequency domains. The analyzed data is then compared to a baseline at block 110. The baseline comparison can be through a simple threshold, a dynamic threshold, or a more complex baseline including a particular signature, data peak configuration, graphical analysis, etc. At block 112, based on the comparison an output warning is provided at block 114 or controlled is passed to block 108 for further analysis. The configuration allows the data to be collected in the background and a rolling analysis performed on the stored data. The storing and analyzing of data can operate continuously or can be triggered based upon some event, for example, periodically, in response to the observance of a unusual peak or other signature in the data from the vortex sensor, receipt of a command from the process control loop, or some other mechanism to initiate the procedure.

Although in one configuration the diagnostics are performed by microprocessor 70 and optionally digital filter 68 within the flowmeter 10, in another example configuration the computations are performed at a remote location, for example at a control room. In such a configuration the flowmeter may be configured to output raw data. This may allow more advanced diagnostics to be performed as the remote location will not be subject to the power restrictions found in a field device such as flowmeter 10. In another example configuration, the diagnostics are only performed periodically or as desired. This allows the field device 10 to enter a high power mode in order to perform such diagnostics. In such a configuration, the power supply 90 may include some type of a power storage unit such as a capacitor or battery which is used to provide additional power during diagnostic computation.

If a sufficient amount of vortex shedding information is collected, it may be compared with known signatures. This comparison can be used to identify possible causes for the flow instability. For example, an oversized regulator may cause a particular type of flow instability. In such a configuration, the diagnostic output provided by the meter 10 can also include information related to the possible cause of the flow instability thereby allowing an operator to change the process configuration. For example, a randomly distributed signal may be an indication of a valve in a "noisy" control scheme.

Although the present invention has been described with reference to preferred embodiments, workers skilled in the art will recognize that changes may be made in form and detail without departing from the spirit and scope of the invention. As discussed herein, a vortex flowmeter is arranged such that it provides an alert by detecting an unsteady flow condition. Individual shedding periods are measured and stored. The stored periods can be used to calculate a standard deviation for a sample and compared against a threshold. In another configuration, the output from the vortex sensors stored in the memory 81, and a fast Fourier transform is performed on the stored data. A peak finding algorithm can be used to determine if multiple frequencies are present and used to provide an indication of an unstable flow condition. In another example, measured shedding cycle periods are used to form a histogram and compared to a known distribution model to look for a bimodal distribution or an otherwise unstable system. In another example configuration, the output from the vortex sensor stored in the memory 81 in the microprocessor implements a curve fit to determine the driving mode of the instability and provide guidance to a customer regarding a probable source of the instability via a digital alert. In another example configuration, the microprocessor corrects for errors in the measured flow rate due to vortex instability. This may be through, for example, curve fitting, weighting functions based upon a profile or amplitude of the instability, or other techniques. Microprocessor 70 provides one example of diagnostic circuitry used to detect instability in the flow of process fluid. In one configuration, element 60 shown in FIG. 1 is configured as output circuitry which provides an output related to analog signal 30 to a remote location. In such a configuration, the microprocessor (diagnostics circuitry) 70 is located at the remote location can be in accordance with any communication protocol or standard. Examples include a process control loop, a wireless process communication technique, or by some other means.

What is claimed is:

1. A vortex flowmeter for measuring a flow rate of a process fluid, comprising:
    a vortex generator arranged to generate vortices in a flow of the process fluid;
    a vortex sensor arranged to sense the vortices in the flow of the process fluid and responsively provide a sensor output related to the flow rate of the process fluid;
    measurement circuitry configured to receive the sensor output and provide a digital output indicative of flow of process fluid including errors in flow measurement due to instability in the flow of process fluid;
    a memory configured to store measurements based upon the digital output; and
    diagnostic circuitry coupled to the memory arranged to detect the instability in the flow of the process fluid during steady state operation based upon the measurements stored in the memory.

2. The vortex flowmeter of claim 1 wherein the diagnostics circuitry detects instability by comparing the measurements to a threshold.

3. The vortex flowmeter of claim 2 wherein the threshold comprises a dynamic threshold.

4. The vortex flowmeter of claim 1 wherein the measurements stored in memory comprise information related to frequency.

5. The vortex flowmeter of claim 1 wherein the diagnostics circuitry detects instability based upon a profile of the measurements stored in the memory.

6. The vortex flowmeter of claim 1 wherein the diagnostics circuitry calculates a statistical parameter of the measurements.

7. The vortex flowmeter of claim 6 wherein the statistical parameter comprises standard deviation.

8. The vortex flowmeter of claim 6 wherein the diagnostic circuitry detects instability in the flow of process fluid by comparing measurements with the statistical parameter.

9. The vortex flowmeter of claim 1 including output circuitry coupled to a process control loop.

10. The vortex flowmeter of claim 9 wherein the vortex flowmeter is powered with power received from the process control loop.

11. The vortex flowmeter of claim 1 wherein the diagnostics circuitry corrects for errors in a measurement flow rate based upon detected instability in the flow of process fluid.

12. The vortex flowmeter of claim 1 wherein the diagnostics circuitry determines modality of the measurements stored in the memory.

13. The vortex flowmeter of claim 12 wherein the diagnostics circuitry detects instability in the flow of the process fluid if the measurements stored in the memory are multimodal.

14. The vortex flowmeter of claim 1 wherein the diagnostics circuitry detects instability in the flow of the process fluid based upon peaks in a frequency of the measurements stored in the memory.

15. The vortex flowmeter of claim 1 wherein the diagnostics circuitry identifies a possible cause of instability in the flow of the process fluid.

16. The vortex flowmeter of claim 15 including an output which provides an output to an operator indicative of the identified possible cause.

17. The vortex flowmeter of claim 1 wherein the diagnostics circuitry operates in response to a command.

18. The vortex flowmeter of claim 1 wherein the diagnostics circuitry operates in response to a peak in the measurements.

19. The vortex flowmeter of claim 1 wherein the diagnostics circuitry operates in response to a detected signature in the measurements stored in the memory.

20. The vortex flowmeter of claim 1 including an output configured to output information related to the sensor output to a remote location and wherein the diagnostic circuitry is located at the remote location.

* * * * *